United States Patent
Hoshino et al.

(10) Patent No.: US 12,447,307 B2
(45) Date of Patent: Oct. 21, 2025

(54) CATHETERS AND METHODS FOR PRODUCING CATHETERS

(71) Applicant: ASAHI INTECC CO., LTD., Seto (JP)

(72) Inventors: Yusuke Hoshino, Seto (JP); Takayuki Yagi, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 895 days.

(21) Appl. No.: 17/387,843

(22) Filed: Jul. 28, 2021

(65) Prior Publication Data

US 2021/0353906 A1 Nov. 18, 2021

Related U.S. Application Data

(63) Continuation of application No. PCT/JP2019/004163, filed on Feb. 6, 2019.

(51) Int. Cl.
*A61M 25/00* (2006.01)

(52) U.S. Cl.
CPC ...... *A61M 25/005* (2013.01); *A61M 25/0045* (2013.01); *A61M 2025/0059* (2013.01); *A61M 2207/00* (2013.01)

(58) Field of Classification Search
CPC ............ A61M 25/005; A61M 25/0045; A61M 25/0009; A61M 25/0069; A61M 2025/0059; A61M 2207/00
See application file for complete search history.

(56) References Cited

U.S. PATENT DOCUMENTS

| | | | |
|---|---|---|---|
| 2005/0021002 A1* | 1/2005 | Deckman | A61M 25/005 604/527 |
| 2010/0094258 A1* | 4/2010 | Shimogami | A61M 25/005 606/191 |
| 2012/0123327 A1* | 5/2012 | Miller | A61M 25/0136 604/95.04 |
| 2014/0180255 A1* | 6/2014 | LeBlanc | A61M 25/008 604/524 |
| 2014/0276643 A1 | 9/2014 | Guo et al. | |

(Continued)

FOREIGN PATENT DOCUMENTS

| CN | 108348726 | | 7/2018 |
|---|---|---|---|
| EP | 0530970 | A1 | 3/1993 |

(Continued)

OTHER PUBLICATIONS

International Search Report for parent PCT Application No. PCT/JP2019/004163.

(Continued)

*Primary Examiner* — James D Ponton
*Assistant Examiner* — John A Doubrava
(74) *Attorney, Agent, or Firm* — Norton Rose Fulbright US LLP

(57) ABSTRACT

This catheter includes an outer layer formed of a resin, and an inner member covered with the outer layer. The distal end of the inner member is located proximally of the distal end of the outer layer. The outer layer has a first region extending from the distal end of the outer layer to the distal end of the inner member, and a second region which is positioned proximally of the first region and covers the inner member. The resin which forms the second region of the outer layer has a lower hardness than the resin which forms the first region.

5 Claims, 14 Drawing Sheets

(56) References Cited

U.S. PATENT DOCUMENTS

2016/0346508 A1\* 12/2016 Williams .......... A61M 25/0053
2018/0256787 A1    9/2018 Guo et al.

FOREIGN PATENT DOCUMENTS

| JP | 2000000309 | 1/2000 |
| JP | 2006223728 | 8/2006 |
| JP | 2010088833 | 4/2010 |
| JP | 2016174829 | 10/2016 |
| JP | 2018526185 | 9/2018 |
| WO | WO 2017/044129 | 3/2017 |

OTHER PUBLICATIONS

International Search Report issued in application No. PCT/JP2019/004163 dated Aug. 13, 2020 (English translation provided).

\* cited by examiner

CATHETERS AND METHODS FOR PRODUCING CATHETERS

CROSS-REFERENCE TO RELATED APPLICATION

This application is a continuation application of International Application No. PCT/JP2019/004163, filed Feb. 6, 2019, the contents of which are incorporated herein by reference in their entirety.

TECHNICAL FIELD

The present invention relates to catheters and methods for producing catheters.

BACKGROUND

Conventionally, catheters are known which are used by being inserted into internal tissues and tubular organs of the human body, such as the blood vessels, digestive tract, or urinary tract. For example, Patent Document 1 discloses a catheter in which an outer layer made of resin is formed on the outside of an inner layer made of resin, and a metal layer which covers the outer periphery of the inner layer is enclosed by the outer layer.

Such catheters are inserted, for example, into a bent blood vessel following a guide wire. At this time, a breakage, or a phenomenon referred as kink, where the catheter becomes bent inside a blood vessel having a winding and complicated path or inside a bifurcated blood vessel, can sometimes occur. In particular, when a metal layer is disposed on the outer periphery of the inner layer as in the catheter of Patent Document 1, a rigidity gap in which the bending rigidity of the catheter significantly changes is likely to be present near the boundary between the section that includes the metal layer and the section that does not include the metal layer. Kinks and breakages are likely to occur due to a concentration of stress at that section, which is problematic.

Patent Document 1: Japanese Unexamined Patent Application Publication No. 2016-174829.

SUMMARY

The present catheters solve the above problems, and an object of the present invention is to provide a technique for suppressing the occurrence of kinks and breakages in a catheter.

The present invention has been made in order to solve at least some of the problems described above, and some of the present catheters can be realized in the following forms.

(1) According to an aspect of the present invention, a catheter is provided. This catheter includes: an outer layer formed of a resin; and an inner member covered with the outer layer; wherein a distal end of the inner member is located proximally of a distal end of the outer layer, the outer layer has a first region extending from the distal end of the outer layer to the distal end of the inner member, and a second region which is positioned proximally of the first region and covers the inner member, and a resin which forms the second region of the outer layer has a lower hardness than a hardness of a resin which forms the first region.

According to this configuration, the difference between the bending rigidity of the resin of the second region of the outer layer and the inner member, and the bending rigidity of the resin of the first region can be reduced. As a result, a bending rigidity gap is less likely to occur in the catheter near the boundary between the section in which the inner member is arranged and the section in which the inner member is not arranged. Therefore, when this catheter is inserted in a blood vessel or the digestive tract of the human body, it is less likely that stress will become concentrated near the boundary between the section in which the inner member is arranged and the section in which the inner member is not arranged, which enables the occurrence of kinks and breakages to be suppressed.

(2) The catheter according to the above aspect may further include an inner layer covered with the outer layer, wherein the inner member is embedded in the outer layer and is a reinforcing body which covers the inner layer. According to this configuration, when the catheter includes a reinforcing body, a bending rigidity gap is less likely to occur near the boundary between the section in which the reinforcing body is arranged and the section in which the reinforcing body is not arranged.

(3) The catheter according to the above aspect may further include a coil body which is embedded in the outer layer and covers the reinforcing body, wherein a distal end of the coil body is located proximally of a distal end of the reinforcing body, the second region is positioned from the distal end of the reinforcing body to the distal end of the coil body, and the outer layer further includes a third region which is located proximally of the second region and embeds the coil body, and a resin which forms the third region of the outer layer has a higher hardness than the hardness of the resin which forms the second region. According to this configuration, because it is possible to suppress the occurrence of a bending rigidity gap near the boundary between the section in which the inner member is arranged and the section in which the inner member is not arranged, while also gradually increasing the rigidity from the distal end of the catheter toward the proximal end, it is possible to improve the deliverability through a bent constricted part.

(4) In the catheter according to the above aspect, the inner member may be an inner layer located on the inner side of the outer layer. According to this configuration, when the catheter includes an inner layer, a bending rigidity gap is less likely to occur near the boundary between the section in which the inner layer is arranged and the section in which the inner layer is not arranged.

(5) The catheter according to the above aspect may further include a reinforcing body which is embedded in the outer layer and covers the inner layer, wherein a distal end of the reinforcing body and the distal end of the inner layer have the same position in an axial direction of the outer layer. According to this configuration, the reinforcing body is arranged in the second region of the outer layer, which covers the inner layer. Because the resin which forms the second region has a lower hardness than the resin which forms the first region, the difference between the bending rigidity of the resin of the second region of the outer layer, the inner layer, and the reinforcing body, and the bending rigidity of the resin of the first region can be reduced. As a result, a bending rigidity gap is less likely to occur in the catheter near the boundary between the section in which the inner layer and the reinforcing body are arranged and the section in which these are not arranged.

(6) The catheter according to the above aspect may further include a coil body which is embedded in the outer layer and covers the reinforcing body, wherein a distal end of the coil body is located proximally of a distal end of the reinforcing body, the second region of the outer layer is positioned from the distal end of the reinforcing body to the distal end of the coil body, and the outer layer further includes a third region, which is located proximally of the second region and is embeds the coil body, and a resin which forms the third region of the outer layer has a higher hardness than the hardness of the resin which forms the second region. According to this configuration, because is possible to suppress the occurrence of a bending rigidity gap near the boundary between the section in which the inner layer and the reinforcing body are arranged and the section in which these are not arranged, while also gradually increasing the rigidity from the distal end of the catheter toward the proximal end, it is possible to improve the deliverability through a bent constricted part.

(7) In the catheter according to the above aspect, the outer layer may include a tip portion, which constitutes a distal end portion of the catheter and has at least a portion in which an outer diameter of the tip portion contracts moving distally along the portion of the tip portion, and a body portion which is positioned proximally of the tip portion, the tip portion may include the first region and the second region of the outer layer, and the body portion may include the third region. According to this configuration, it is possible to suppress the occurrence of a rigidity gap in the tip portion near the boundary between the section in which the inner member is arranged and the section in which the inner member is not arranged.

The present invention may be realized in various forms, and can be realized in a form such as a medical tube, a distal end member of a catheter, a catheter production device, or a method for producing a catheter.

The terms "comprise" and any form thereof such as "comprises" and "comprising," "have" and any form thereof such as "has" and "having," "include" and any form thereof such as "includes" and "including," and "contain" and any form thereof such as "contains" and "containing" are open-ended linking verbs. As a result, a device, like a guide wire, that "comprises," "has," "includes," or "contains" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the devices and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

DETAILED DESCRIPTION

First Embodiment

Figure 1:
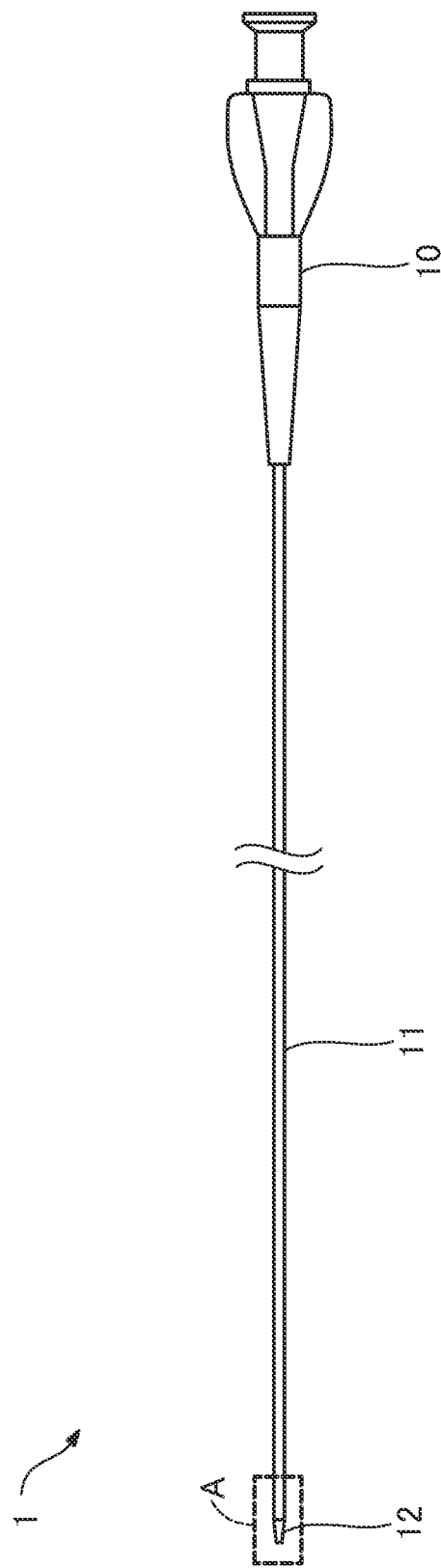
FIG. 1 is a schematic view illustrating an overall configuration of a catheter of a first embodiment.
Figure 2:
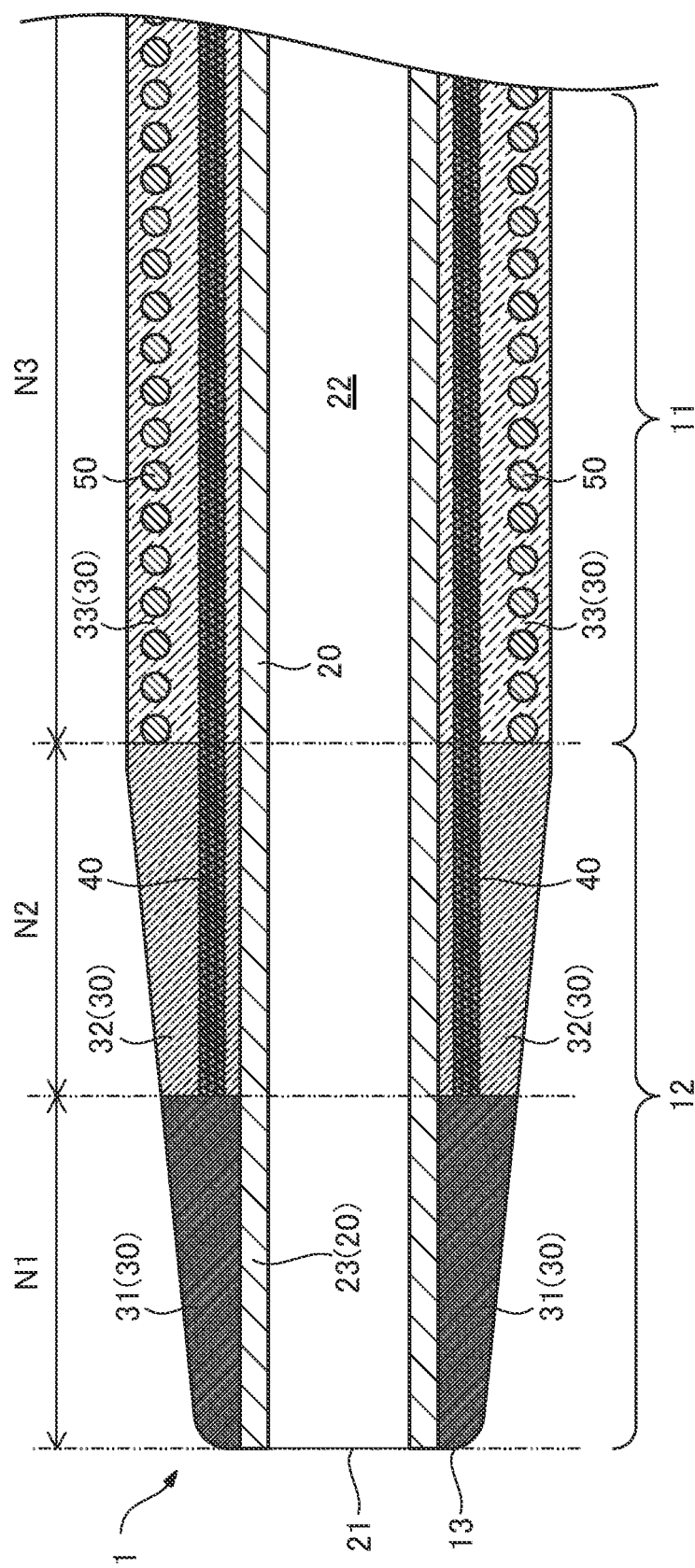
FIG. 2 is a schematic cross-sectional view of section A of the catheter of FIG. 1.

A catheter 1 of a first embodiment will be described using FIG. 1 and FIG. 2. FIG. 1 is a schematic view illustrating an overall configuration of the catheter 1 of the first embodiment. FIG. 2 is a schematic cross-sectional view illustrating a section A of the catheter 1 shown in FIG. 1. Hereinafter, the left side (tip portion 12 side) of FIG. 1 is referred to as the "distal end side" of the catheter 1, and the right side (connector 10 side) of FIG. 1 is referred to as the "proximal end side" of the catheter 1. The distal end side of the catheter 1 is the side which is inserted into the body (distal side), and the proximal end side of the catheter 1 is the side which is operated by a technician such as a physician (proximal side). The catheter 1 is used to diagnose or treat a constricted part or an occluded part. For example, it is inserted into a blood vessel of the heart when a constricted part has formed, and used when the constricted part in the blood vessel is expanded.

As shown in FIG. 1, the catheter 1 includes a connector 10, a body portion 11 (catheter shaft), and a tip portion 12. The connector 10 is connected to the proximal end side of the body portion 11, and the tip portion 12 is connected to the distal end side of the body portion 11. As shown in FIG. 2, the body portion 11 is a long and hollow part which includes an inner layer 20, an outer layer 30, a reinforcing body 40, and a coil body 50. The tip portion 12 is a hollow part which is configured such that the outer diameter contracts toward the distal end side, and in the first embodiment, it includes the inner layer 20, the outer layer 30, and the reinforcing body 40. That is to say, the tip portion 12 of the first embodiment includes a portion of the distal end side of both the inner layer 20 and the reinforcing body 40.

The inner layer 20 is a tube formed of a resin, and a lumen 22 into which a guide wire or another catheter is inserted is formed inside of the inner layer. The resin material which forms the inner layer 20 is not particularly limited, and examples include PTFE (polytetrafluoroethylene). The outer layer 30 is arranged on the outer periphery of the inner layer 20, and the inner layer 20 is covered with the outer layer 30. The distal end side of the inner layer 20 of the first embodiment extends to the tip portion 12. Here, the section of the inner layer 20 extending to the tip portion 12 is also referred to as an inner layer extension portion 23. The distal end 21 of the inner layer 20 (inner layer extension portion 23) reaches a distal end 13 of the tip portion 12, that is to say, the distal end of the outer layer 30.

The outer layer 30 is formed of resin and covers the inner layer 20, the reinforcing body 40, and the coil body 50. The outer layer 30 is formed on both the body portion 11 and the tip portion 12, and the hardness of the resin differs between the body portion 11 and the tip portion 12. Furthermore, the outer layer 30 which forms the tip portion 12 is formed of a resin having different hardness in a first region N1 and a second region N2 as described below. The resin material which forms the outer layer 30 is not particularly limited, and examples include polyamides, polyamide elastomers, polyesters, polyurethanes, and polyurethane elastomers. Moreover, the resin which forms the outer layer 30 may contain tungsten powder, and the hardness of the resin may be changed depending on the content of the tungsten powder therein. Here, the resin which forms the tip portion 12 contains tungsten powder, and the hardness of the resin is changed by changing the content of the tungsten powder between the first region N1 and the second region N2 as described below. The amount of tungsten powder contained in the resin which forms the tip portion 12 can, for example, be in a range of approximately 65 to 90 wt %. As a result of including tungsten powder, which is a radiopaque powder, in the resin which forms the tip portion 12, a technician such as a physician can accurately recognize the position of the catheter 1 when performing coronary angiography.

The reinforcing body 40 is a braided body (metal-braided layer) in which a first wire and a second wire are woven with each other into a mesh form, is arranged on the outer periphery of the inner layer 20, and covers (or is embedded in) the outer layer 30. The distal end side of the reinforcing body 40 extends part way through the tip portion 12 (up to a boundary between the first region N1 and the second region N2 of the outer layer 30), and is covered with the outer layer 30 of the tip portion 12. In other words, the distal end of the reinforcing body 40 is located proximally of the distal end of the outer layer 30.

The coil body 50 is a reinforcing layer in which a wire having a circular cross-section is wound. The coil body 50 is arranged on the outer periphery of the reinforcing body 40, and is in a state where it covers the reinforcing body 40 when covered with (or embedded in) the outer layer 30. The distal end of the coil body 50 is located at the boundary between the tip portion 12 and the body portion 11 (the boundary between the second region N2 and a third region N3 of the outer layer 30), and is located proximally of the distal end of the reinforcing body 40. Examples of the material of the wire constituting the coil body 50 include, but are not limited to, stainless steel (SUS304). For example, a metal material such as tungsten or Ni—Ti alloy, or a resin material such as reinforced plastic (PEEK) may also be used. The winding direction of the wire which forms the coil body 50 may be in a right-hand direction or a left-hand direction toward the distal end side.

Here, the region of the outer layer 30 from the distal end of the outer layer 30 to the distal end of the reinforcing body 40 is the first region N1, the region from the distal end of the reinforcing body 40 to the distal end of the coil body 50 is the second region N2, and the region further on the rear end side than the distal end of the coil body 50 is the third region N3. The first region N1, the second region N2, and the third region N3 of the outer layer 30 are disposed consecutively in this order from the distal end of the catheter 1 toward the proximal end. The first region N1 and the second region N2 of the outer layer 30 correspond to the tip portion 12 of the catheter 1, and the third region N3 of the outer layer 30 corresponds to the body portion 11 of the catheter 1. The first region N1 of the outer layer 30 is formed of a resin 31 and covers the inner layer 20 (inner layer extension portion 23). The second region N2 of the outer layer 30 is formed of a resin 32 and covers the inner layer 20 (inner layer extension portion 23) and the reinforcing body 40. The third region N3 of the outer layer 30 is formed of a resin 33 and covers the inner layer 20, the reinforcing body 40, and the coil body 50.

The outer layer 30 is configured such that the hardness of the resin 32 which forms the second region N2 is lower than the hardness of the resin 31 which forms the first region N1. Furthermore, the outer layer 30 is configured such that the hardness of the resin 33 which forms the third region N3 is higher than the hardness of the resin 32 which forms the second region N2. In the first embodiment, the "hardness of the resin" is not limited to the hardness of the resin itself, but refers to the overall hardness after the hardness of the materials which are kneaded with the resin has been added to the hardness of the resin itself. Therefore, a difference in the hardness of the resin can be achieved not only by changing the type of resin, but can also be achieved by using the same type of resin and changing the amount of the materials which are kneaded with the resin. In the first embodiment, the difference in the hardness is achieved by using the same type of resin and changing the amount of tungsten powder kneaded with the resin. Specifically, the resin 31, the resin 32, and the resin 33 are formed of the same type of resin, but the amount of tungsten powder kneaded with the resin (the ratio with respect to the resin) is higher for the resin 31 than the resin 32, and lower for the resin 32 than the resin 33.

Because the outer layer 30 of the first embodiment is configured such that the hardness of the resin 32 which forms the second region N2 is lower than the hardness of the resin 31 which forms the first region N1, in the tip portion 12 of the catheter 1, it is possible to reduce the difference between the bending rigidity of the section that includes the reinforcing body 40 (the proximal end side of the tip portion 12) and the bending rigidity of the section that does not include the reinforcing body 40 (the distal end side of the tip portion 12). Specifically, by setting the hardness of the resin 32 of the second region N2, which covers the reinforcing body 40, to be lower than the hardness of the resin 31 of the first region N1, which does not cover the reinforcing body 40, it is possible to reduce the difference between the bending rigidity of the proximal end side of the tip portion 12, which is configured by the resin 32 of the second region N2, the reinforcing body 40, and the inner layer 20, and the bending rigidity of the distal end side of the tip portion 12, which is configured by the resin 31 of the first region N1 and the inner layer 20. Consequently, a bending rigidity gap is less likely to occur in the catheter 1 near the boundary between the section in which the reinforcing body 40 having a high bending rigidity is arranged, and the section in which the reinforcing body 40 is not arranged. Therefore, when this catheter 1 is inserted in a blood vessel or the digestive tract of the human body, it is less likely that stress will become concentrated near the boundary between the section in which the reinforcing body 40 is arranged and the section in which the reinforcing body 40 is not arranged, which enables the occurrence of kinks and breakages to be suppressed.

Further, because the outer layer 30 of the first embodiment is configured such that the hardness of the resin 33 which forms the third region N3 is higher than the hardness of the resin 32 which forms the second region N2, the deliverability through a bent constricted part can be improved. Generally, in a catheter, it is preferable for the bending rigidity to gradually increase from the distal end side toward the proximal end side. As a result of the distal end side having a relatively high softness, it is possible to reduce the likelihood of damage to the inner surface of a blood vessel, even inside a bifurcated blood vessel in which the blood vessel has a sharp angle. On the other hand, as a result of the proximal end side having a relatively high rigidity, it is possible to enhance the torquability that transmits a rotational motion of the catheter imparted by the operator to the distal end side. Furthermore, by making the change in the rigidity of the catheter in the axial direction as constant as possible, it is possible to suppress the occurrence of kinks and the like due to a rigidity gap. Therefore, by gradually increasing the bending rigidity from the distal end side toward the proximal end side, it is possible to improve the deliverability of the catheter through a bent constricted part. In the catheter 1 of the first embodiment, by setting the hardness of the resin 33 of the third region N3 to be higher than the hardness of the resin 32 of the second region N2 on the distal end side, the bending rigidity can be changed in the axial direction of the catheter 1 in multiple stages. As a result, because the rigidity can be gradually increased from the distal end of the catheter 1 toward the proximal end, it is possible to suppress the occurrence of a rigidity gap, while also achieving an improvement in the deliverability through a bent constricted part.

Comparative Example

Figure 3:
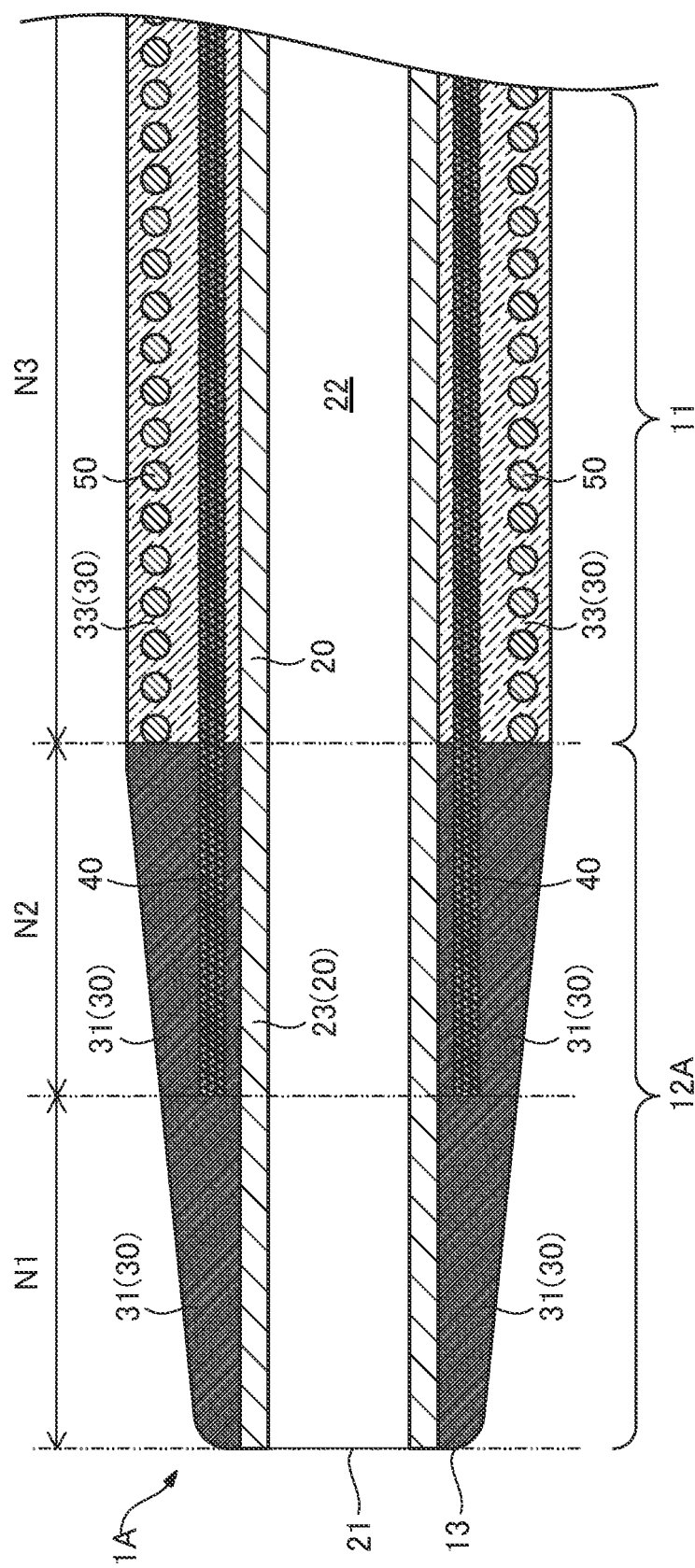
FIG. 3 is a schematic cross-sectional view of a portion of a catheter of a comparative example.

FIG. 3 is a cross-sectional schematic view illustrating a section of a catheter 1A of a comparative example at the distal end side. The catheter 1A of the comparative example is different from the catheter 1 of the first embodiment in that both the second region N2 and the first region N1 of the outer layer 30 are formed of the resin 31. That is to say, in the catheter 1A of the comparative example, the hardness of the resin of the second region N2 of the outer layer 30 is the same as the hardness of the resin of the first region N1. Consequently, in the tip portion 12A of the catheter 1A, a large difference in the bending rigidity occurs between the section that includes the reinforcing body 40 having a high bending rigidity (the proximal end side of the tip portion 12A), and the section that does not include the reinforcing body 40 (the distal end side of the tip portion 12A), and a large rigidity gap is likely to occur at the boundary thereof. Therefore, when the catheter 1A of the comparative example is inserted into a blood vessel or a digestive tract of the human body, stress becomes concentrated at the section in which the rigidity gap has occurred, and kinks and breakages become more likely.

Exemplary Effects of First Embodiment

According to the catheter 1 of the first embodiment described above, the difference between the bending rigidity of the composite of the resin 32 of the second region N2 of the outer layer 30 and the reinforcing body 40, and the bending rigidity of the resin 31 of the first region N1 can be reduced. Consequently, it is possible to suppress the occurrence of a bending rigidity gap in the catheter 1 near the boundary between the section in which the reinforcing body 40 serving as the inner member is arranged and the section in which the reinforcing body 40 is not arranged. Therefore, when the catheter 1 of the first embodiment is inserted in a blood vessel or the digestive tract of the human body, it is less likely that stress will becomes concentrated near the boundary between the section in which the reinforcing body 40 is arranged (the proximal end side of the tip portion 12) and the section in which the reinforcing body 40 is not arranged (the distal end side of the tip portion 12), which enables the occurrence of kinks and breakages to be suppressed.

Furthermore, according to the catheter 1 of the first embodiment, the hardness of the resin 33 which forms the third region N3 of the outer layer 30 is also configured to be higher than the hardness of the resin 32 which forms the second region N2. According to this configuration, as described above, because it is possible to suppress the occurrence of a bending rigidity gap near the boundary between the section in which the reinforcing body 40 is arranged and the section in which the reinforcing body 40 is not arranged, while also gradually increasing the rigidity of the catheter 1 from the distal end toward the proximal end, the deliverability through a bent constricted part can be improved.

Conventionally, a technique for changing the hardness of a resin constituting an outer layer in a catheter is known (for example, see Japanese Unexamined Patent Application Publication No. 2016-174829). In this conventional technique, it is disclosed that by setting the resin hardness of a second region of the outer layer, which covers the distal end of a metal layer, to be higher than the resin hardness of a first region of the outer layer, which is located further on the distal end side, it is possible to prevent the distal end of the metal layer from protruding from the outer layer. However, the present inventors have found that a rigidity gap is likely to occur on the distal end side of the catheter near the boundary between the section that includes the metal layer and the section which does not include the metal layer. Further, the present inventors have found that by lowering the resin hardness of the outer layer that covers the section that includes the metal layer to be lower than the hardness of the outer layer that covers the section that includes the metal layer, the rigidity gap near the boundary is reduced. For example, because Japanese Unexamined Patent Application Publication No. 2016-174829 does not describe in any way that a rigidity gap is likely to occur near the boundary between the section in which the metal layer is provided and the section in which the metal layer is not provided, a person skilled in the art would be unable to conceive the configuration of the present application from the invention described in the publication. Rather, because the publication disclosed the problem of preventing the metal layer from protruding from the outer layer by setting the resin hardness of the outer layer that covers the metal layer to be relatively higher, it can be said that technical obstacles existed in reaching the configuration of the present application.

Second Embodiment

Figure 4:
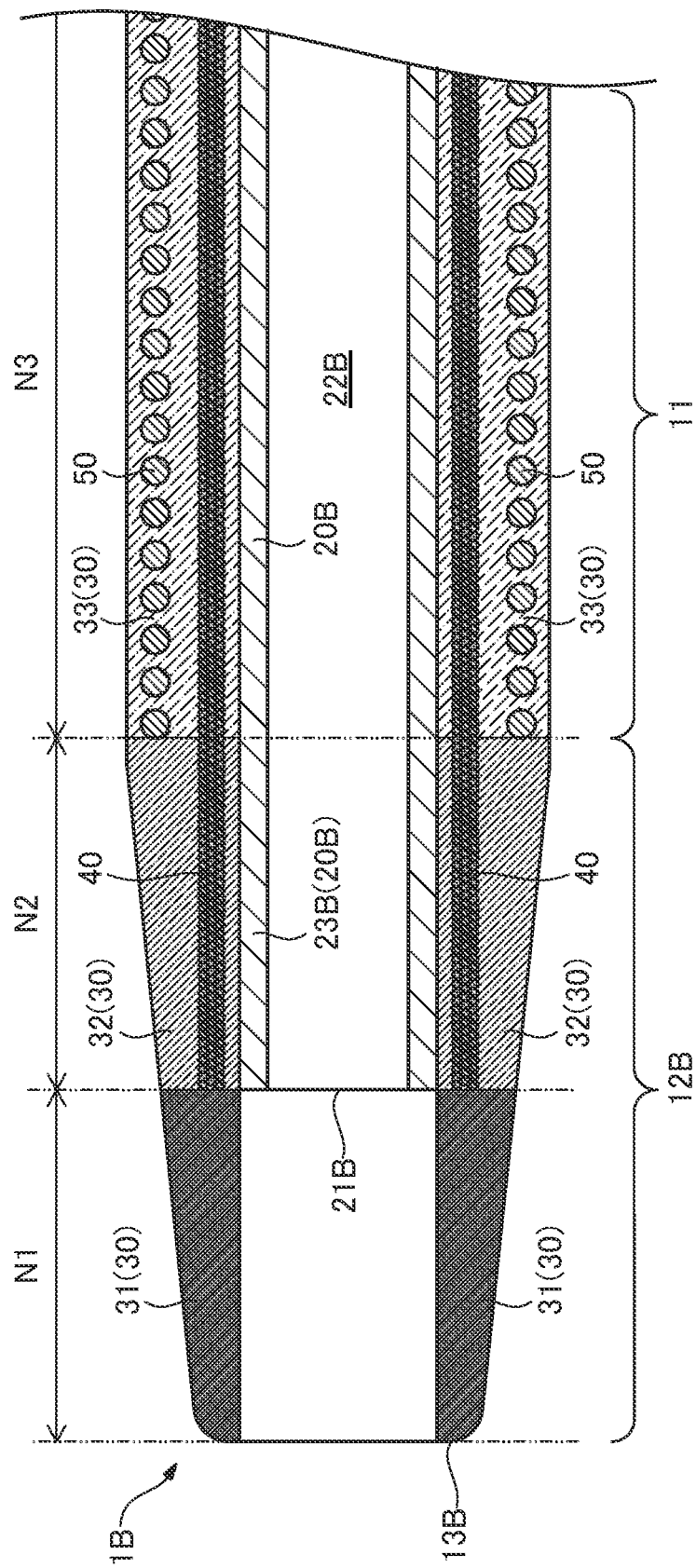
FIG. 4 is a schematic cross-sectional view of a portion of a catheter of a second embodiment.

FIG. 4 is an schematic cross-sectional view illustrating a section of a catheter 1B of a second embodiment at the distal end side. The catheter 1B of the second embodiment is different from the catheter 1 of the first embodiment in that the axial position of the distal end 21B of the inner layer 20B (inner layer extension portion 23B) is different. The rest of the configuration is the same as that of the catheter 1 of the first embodiment, and therefore, the description will be omitted. In the catheter 1B of the second embodiment, the distal end 21B of the inner layer 20B is located proximally of the distal end 13B of the tip portion 12B, that is to say, the distal end of the outer layer 30B, and has the same position as the distal end of the reinforcing body 40 in the axial direction of the catheter 1B.

In the second embodiment, the region of the outer layer 30 from the distal end of the outer layer 30 to the distal end 21B of the inner layer 20B is the first region N1, the region from the distal end 21B of the inner layer 20B to the distal end of the coil body 50 is the second region N2, and the region proximal of the distal end of the coil body 50 is the third region N3. In the second embodiment, because the axial positions of the distal end of the reinforcing body 40 and the distal end 21B of the inner layer 20B are the same, the distal end of the reinforcing body 40 is located at the boundary between the first region N1 and the second region N2 of the outer layer 30. In a similar manner to the first embodiment, the outer layer 30 is configured such that the hardness of the resin 32 which forms the second region N2 is lower than the hardness of the resin 31 which forms the first region N1. Furthermore, the outer layer 30 is configured such that the hardness of the resin 33 which forms the third region N3 is higher than the hardness of the resin 32 which forms the second region N2.

In this case, in the tip portion 12B of the catheter 1B, it is possible to reduce the difference between the bending rigidity of the section that includes the inner layer 20B and the reinforcing body 40 (the proximal end side of the tip portion 12B) and the bending rigidity of the section that does not include the inner layer 20B and the reinforcing body 40 (the distal end side of the tip portion 12B). Specifically, by setting the hardness of the resin 32 of the second region N2, which covers the inner layer 20B and the reinforcing body 40, to be lower than the hardness of the resin 31 of the first region N1, which does not cover the inner layer 20B or the reinforcing body 40, it is possible to reduce the difference between the bending rigidity of the proximal end of the tip portion 12B, which is configured by the resin 32 of the second region N2, the reinforcing body 40, and the inner layer 20B, and the bending rigidity of the distal end side of the tip portion 12B, which is configured by only the resin 31 of the first region N1. Consequently, it is possible to suppress the occurrence of a bending rigidity gap in the catheter 1B near the boundary between the section in which the inner layer 20B and the reinforcing body 40 having a high bending rigidity are arranged, and the section in which the inner layer 20B and the reinforcing body 40 are not arranged.

According to the catheter 1B of the second embodiment described above, the first region N1 and the second region N2 of the outer layer 30 can be set on the basis of the presence or absence of the inner layer 20B. In this case, it is possible to suppress the occurrence of a rigidity gap near the boundary between a position that includes the inner layer 20B and a position that does not include the inner layer 20B. Furthermore, because the outer layer 30 is configured such that the hardness of the resin 33 which forms the third region N3 is higher than the hardness of the resin 32 which forms the second region N2, it is possible to improve the deliverability through a bent constricted part.

Third Embodiment

Figure 5:
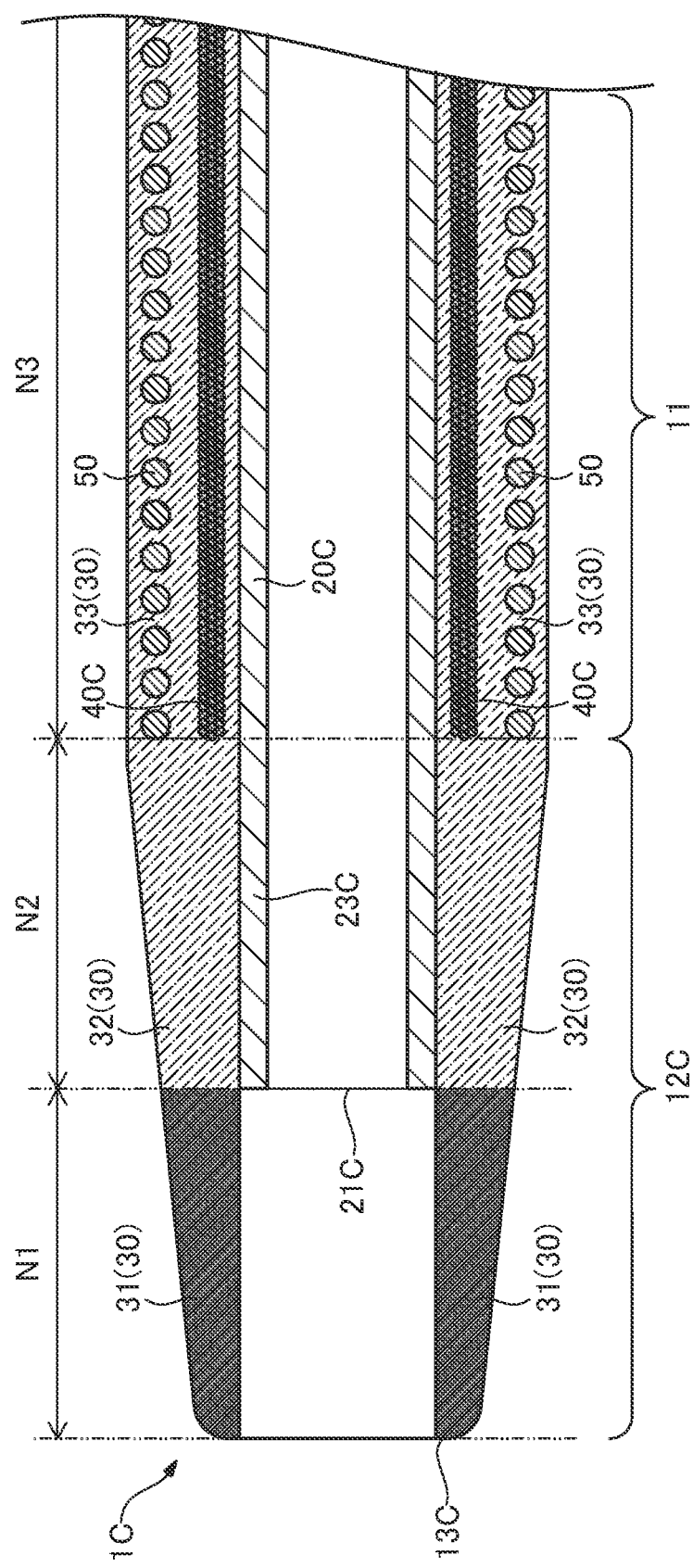
FIG. 5 is a schematic cross-sectional view of a portion of a catheter of a third embodiment.

FIG. 5 is a schematic cross-sectional view illustrating a section of a catheter 1C of a third embodiment at the distal end side. The catheter 1C of the third embodiment is different from the catheter 1 of the first embodiment in that the position of the distal end 21C of the inner layer 20C (inner layer extension portion 23C) and the position of the distal end of the reinforcing body 40C are different. The rest of the configuration is the same as that of the catheter 1 of the first embodiment, and therefore, the description will be omitted. In the catheter 1C of the third embodiment, the distal end 21C of the inner layer 20C is located proximally of the distal end 13C of the tip portion 12C, that is to say, the distal end of the outer layer 30. Furthermore, the distal end of the reinforcing body 40C is located proximally of the distal end 21C of the inner layer 20C, and has the same position as the distal end of the coil body 50 in the axial direction of the catheter 1C.

In the third embodiment, the region of the outer layer 30 from the distal end of the outer layer 30 to the distal end 21C of the inner layer 20C is the first region N1, the region from the distal end 21C of the inner layer 20C to the distal end of the coil body 50 is the second region N2, and the region proximal of the distal end of the coil body 50 is the third region N3. In the third embodiment, the distal end 21C of the inner layer 20C is located at the boundary between the first region N1 and the second region N2 of the outer layer 30, and the distal end of the reinforcing body 40C is located at the boundary between the second region N2 and the third region N3 of the outer layer 30. In a similar manner to the first embodiment, the outer layer 30 is configured such that the hardness of the resin 32 which forms the second region N2 is lower than the hardness of the resin 31 which forms the first region N1. Furthermore, the outer layer 30 is configured such that the hardness of the resin 33 which forms the third region N3 is higher than the hardness of the resin 32 which forms the second region N2.

Even in this case, in the tip portion 12C of the catheter 1C, it is possible to reduce the difference between the bending rigidity of the section that includes the inner layer 20 (the proximal end side of the tip portion 12C) and the bending rigidity of the section that does not include the inner layer 20 (the distal end side of the tip portion 12C). Specifically, by setting the hardness of the resin 32 of the second region N2, which covers the inner layer 20C, to be lower than the hardness of the resin 31 of the first region N1, which does not cover the inner layer 20B, it is possible to reduce the difference between the bending rigidity of the proximal end side of the tip portion 12C, which is configured by the resin 32 of the second region N2 and the inner layer 20C, and the bending rigidity of the distal end side of the tip portion 12C, which is configured by only the resin 31 of the first region N1. Consequently, it is possible to suppress the occurrence of a bending rigidity gap in the catheter 1C near the boundary between the section in which the inner layer 20C having a high bending rigidity is arranged, and the section in which the inner layer 20C is not arranged.

According to the catheter 1C of the third embodiment described above, by changing the hardness of the outer layer 30, the boundary at which the occurrence of a rigidity gap can suppressed is not limited to the boundary between a position that includes the reinforcing body 40C and a position that does not include the reinforcing body 40C. As described in the third embodiment, by changing the hardness of the outer layer 30, it is also possible to suppress the occurrence of a rigidity gap at the boundary between a position in which the inner layer 20C is provided and a position in which the inner layer 20C is not provided.

Fourth Embodiment

Figure 6:
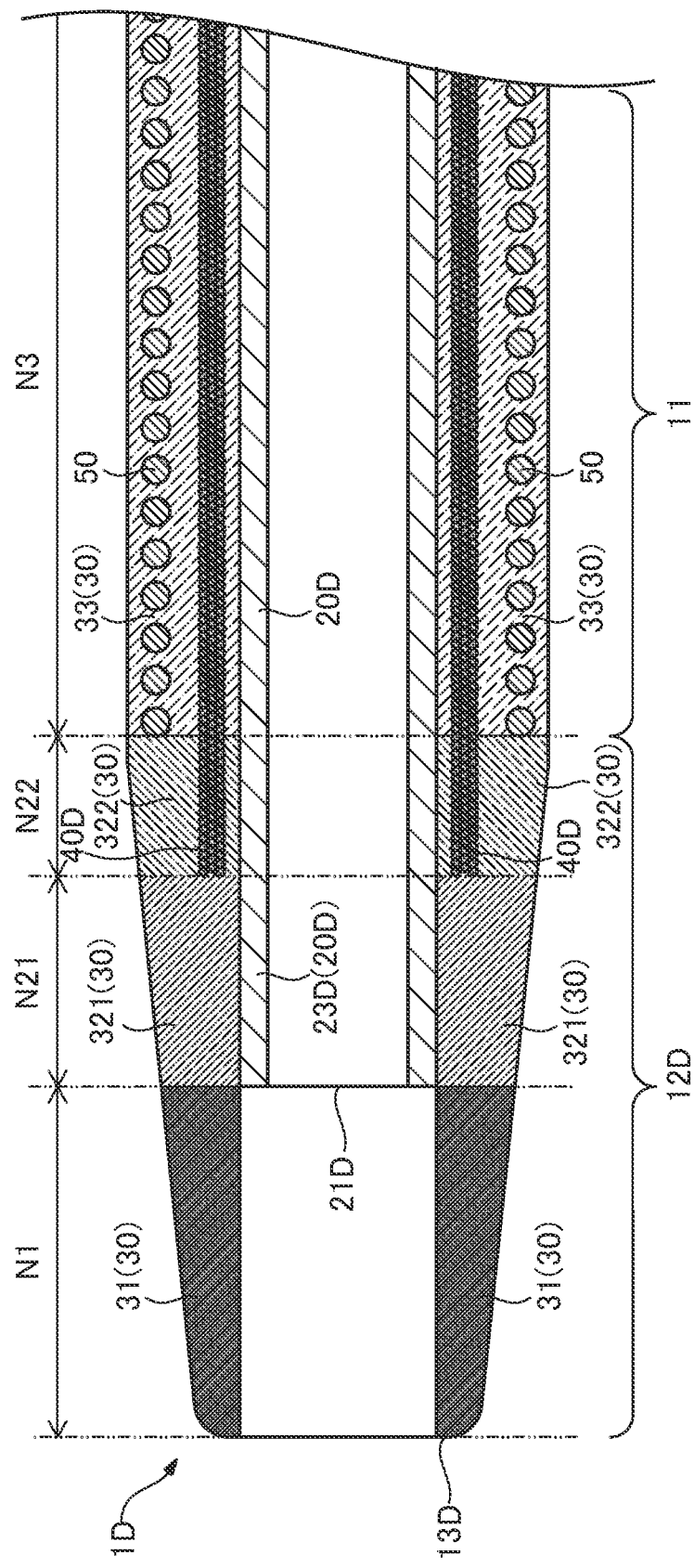
FIG. 6 is a schematic cross-sectional view of a portion of a catheter of a fourth embodiment.

FIG. 6 is a schematic cross-sectional view illustrating a section of a catheter 1D of a fourth embodiment at the distal end side. The catheter 1D of the fourth embodiment is different from the catheter 1 of the first embodiment in that the position of the distal end 21D of the inner layer 20D (inner layer extension portion 23D) and the position of the distal end of the reinforcing body 40D are different. The rest of the configuration is the same as that of the catheter 1 of the first embodiment, and therefore, the description will be omitted. In the catheter 1D of the fourth embodiment, the distal end 21D of the inner layer 20D is located proximally of the distal end 13D of the tip portion 12D, that is to say, the distal end of the outer layer 30. Furthermore, although the distal end of the reinforcing body 40D is located proximally of the distal end 21D of the inner layer 20D, it is located distally of the distal end of the coil body 50.

In the fourth embodiment, the region of the outer layer 30 from the distal end of the outer layer 30 to the distal end 21D of the inner layer 20D is the first region N1, the region from the distal end 21D of the inner layer 20D to the distal end of the reinforcing body 40D is the twenty-first region N21, the region from the distal end of the reinforcing body 40D to the distal end of the coil body 50 is the twenty-second region N22, and the region proximal of the distal end of the coil body 50 is the third region N3. In the fourth embodiment, the distal end 21D of the inner layer 20D is located at the boundary between the first region N1 and the twenty-first region N21 of the outer layer 30, and the distal end of the reinforcing body 40D is located at the boundary between the twenty-first region N21 and the twenty-second region N22 of the outer layer 30.

The outer layer 30 of the fourth embodiment is configured such that the hardness of the resin 321 which forms the twenty-first region N21 is lower than the hardness of the resin 31 which forms the first region N1. Furthermore, the outer layer 30 is configured such that the hardness of the resin 322 which forms the twenty-second region N22 is lower than the hardness of the resin 321 which forms the twenty-first region N21. Moreover, the outer layer is configured such that the hardness of the resin 33 which forms the third region N3 is higher than the hardness of the resin 322 which forms the twenty-second region N22. In the fourth embodiment, the resin 31, the resin 321, the resin 322, and the resin 33 are formed of the same type of resin, but the amount of tungsten powder kneaded with the resin (the ratio with respect to the resin) is higher in the resin 31 than in the resin 321, higher in the resin 321 than in the resin 322, and lower in the resin 322 than in the resin 33.

Even in this configuration, in a similar manner to the first embodiment, because the outer layer 30 is configured such that the hardness of the resin 321 which forms the twenty-first region N21 is lower than the hardness of the resin 31 which forms the first region N1, in the tip portion 12D of the catheter 1D, it is possible to reduce the difference between the bending rigidity of the section that includes the inner layer 20D and the bending rigidity of the section that does not include the inner layer 20D. Furthermore, because the outer layer 30 is configured such that the hardness of the resin 322 which forms the twenty-second region N22 is lower than the hardness of the resin 321 which forms the twenty-first region N21, in the tip portion 12D, it is possible to reduce the difference between the bending rigidity of the section that includes the reinforcing body 40D and the bending rigidity of the section that does not include the reinforcing body 40D. Consequently, it is possible to suppress the occurrence of a bending rigidity gap in the catheter 1D near the boundary between the section in which the inner layer 20D is arranged and the section in which the inner layer 20D is not arranged, and near the boundary between the section in which the reinforcing body 40D is arranged and the section in which the reinforcing body 40D is not arranged.

According to the catheter 1D of the fourth embodiment described above, even in a catheter in which the positions of the distal end portions of the inner layer 20D and the reinforcing body 40D are different, it is possible to suppress the occurrence of a rigidity gap near each boundary. Furthermore, because the outer layer 30 is configured such that the hardness of the resin 33 which forms the third region N3 is higher than the hardness of the resin 322 which forms the twenty-second region N22, it is possible to improve the deliverability through a bent constricted part.

Fifth Embodiment

Figure 7:
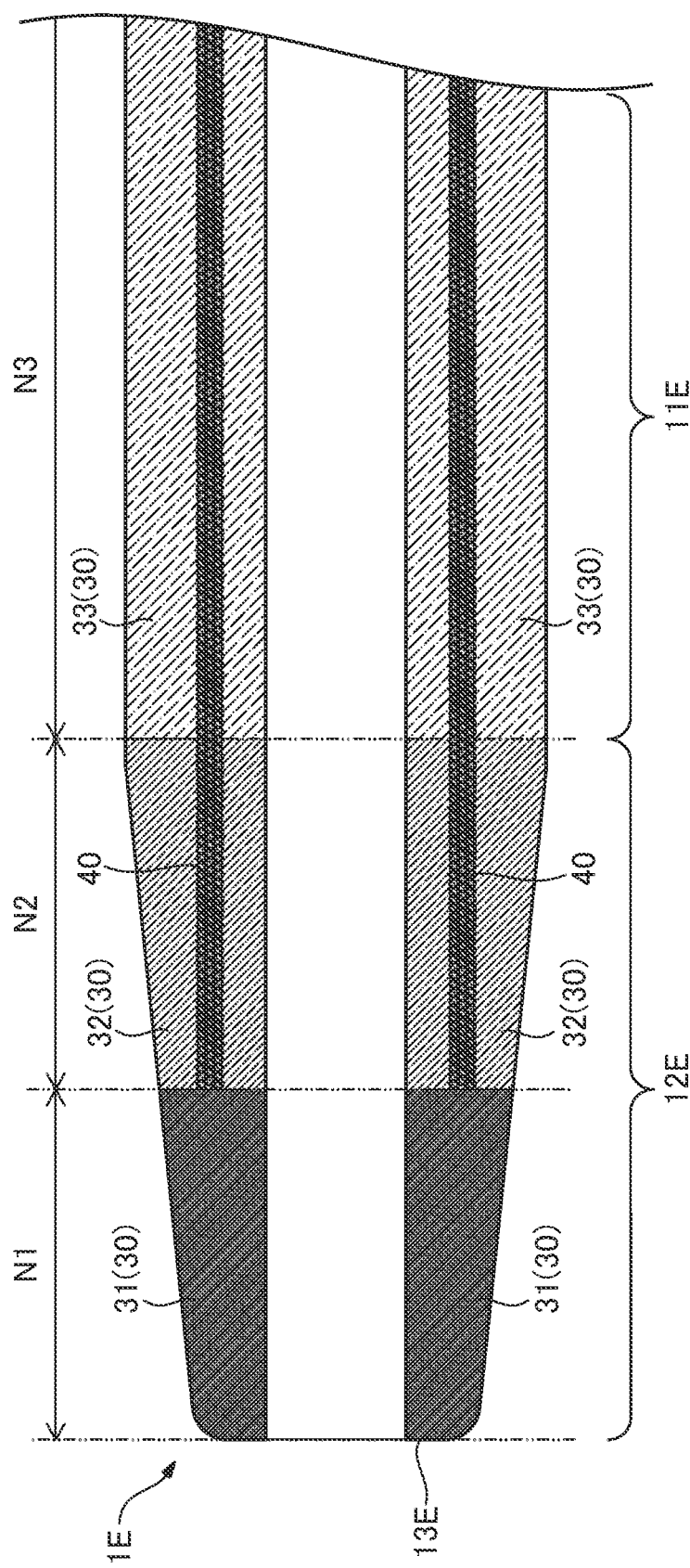
FIG. 7 is a schematic cross-sectional view of a portion of a catheter of a fifth embodiment.

FIG. 7 is a schematic cross-sectional view illustrating a section of a catheter 1E of a fifth embodiment at the distal end side. The catheter 1E of the fifth embodiment is different from the catheter 1 of the first embodiment in that the inner layer 20 and the coil body 50 are omitted. The rest of the configuration is the same as that of the catheter 1 of the first embodiment, and therefore, the description will be omitted. In the catheter 1E of the fifth embodiment, the region of the outer layer 30 from the distal end of the outer layer 30 to the distal end of the reinforcing body 40 is the first region N1, the region from the distal end of the reinforcing body 40 to the proximal end of the tip portion 12E is the second region N2, and the region proximal of the proximal end of the tip portion 12E is the third region N3. The resin 32 of the second region N2 and the resin 33 of the third region N3 each cover the reinforcing body 40. In a similar manner to the first embodiment, the outer layer 30 is configured such that the hardness of the resin 32 which forms the second region N2 is lower than the hardness of the resin 31 which forms the first region N1. Furthermore, the outer layer 30 is configured such that the hardness of the resin 33 which forms the third region N3 is higher than the hardness of the resin 32 which forms the second region N2.

Even in this case, in the tip portion 12E of the catheter 1E, it is possible to reduce the difference between the bending rigidity of the section that includes the reinforcing body 40 (the proximal end side of the tip portion 12E) and the bending rigidity of the section that does not include the reinforcing body 40 (the distal end side of the tip portion 12E). Consequently, it is possible to suppress the occurrence of a bending rigidity gap in the catheter 1E near the boundary between the section in which the reinforcing body 40 having a high bending rigidity is arranged, and the section in which the reinforcing body 40 is not arranged.

According to the catheter 1E of the fifth embodiment described above, even in a catheter which does not include the inner layer 20 and the coil body 50, it is possible to suppress the occurrence of a rigidity gap near the boundary between a position that includes the reinforcing body 40 and a position that does not include the reinforcing body 40. Furthermore, because the outer layer 30 is configured such that the hardness of the resin 33 which forms the third region N3 is higher than the hardness of the resin 32 which forms the second region N2, it is possible to improve the deliverability through a bent constricted part.

Sixth Embodiment

Figure 8:
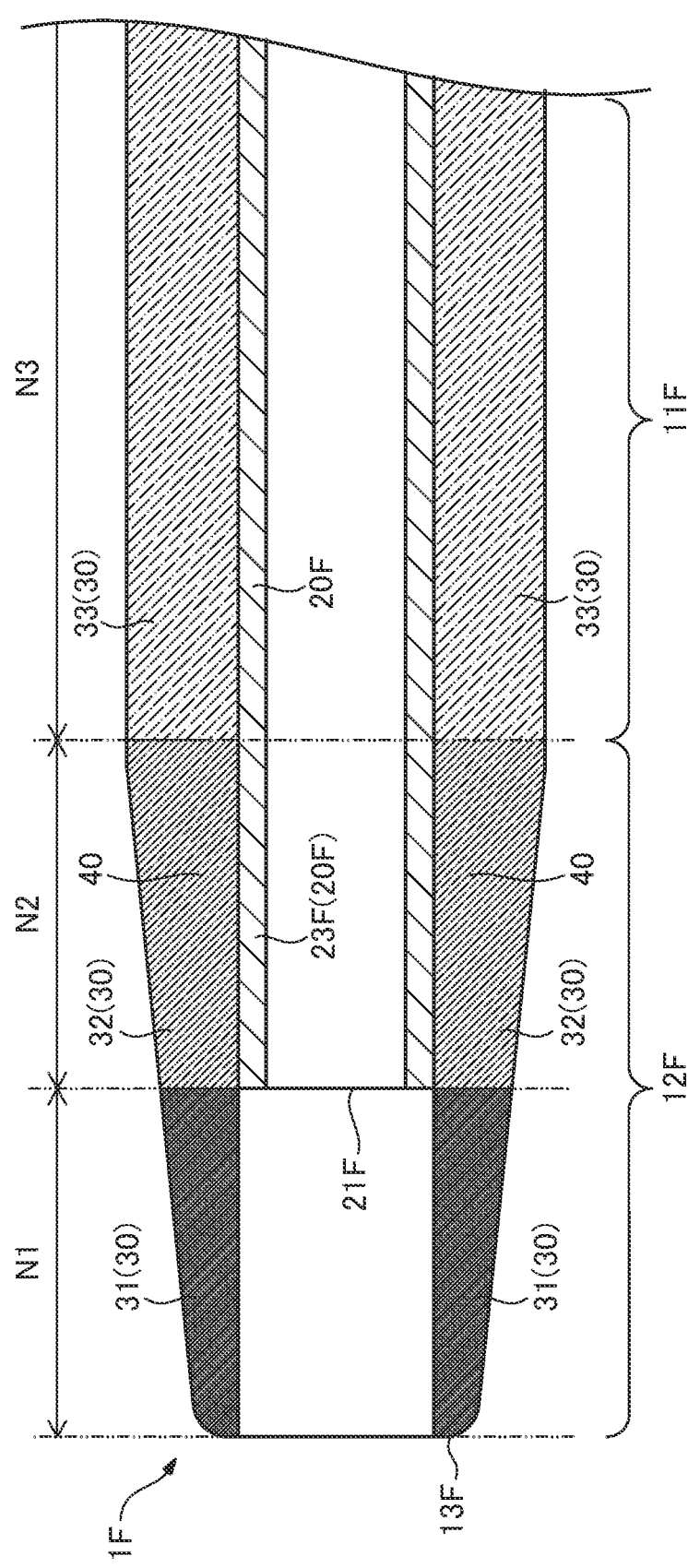
FIG. 8 is a schematic cross-sectional view of a portion of a catheter of a sixth embodiment.

FIG. 8 is a schematic cross-sectional view illustrating a section of a catheter 1F of a sixth embodiment at the distal end side. The catheter 1F of the sixth embodiment is different from the catheter 1 of the first embodiment in that the reinforcing body 40 and the coil body 50 are omitted, and the position of the distal end 21F of the inner layer 20F (inner layer extension portion 23F) is different. The rest of the configuration is the same as that of the catheter 1 of the first embodiment, and therefore, the description will be omitted. In the catheter 1F of the sixth embodiment, the distal end 21F of the inner layer 20F is located proximally of the distal end 13F of the tip portion 12F. In the catheter 1F of the sixth embodiment, the region of the outer layer 30 from the distal end of the outer layer 30 to the distal end 21F of the inner layer 20F is the first region N1, the region from the distal end 21F of the inner layer 20F to the proximal end of the tip portion 12F is the second region N2, and the region proximal of the proximal end of the tip portion 12F is the third region N3. The distal end 21F of the inner layer 20F is located at the boundary between the first region N1 and the second region N2 of the outer layer 30. The resin 32 of the second region N2 and the resin 33 of the third region N3 each cover the inner layer 20F. In a similar manner to the first embodiment, the outer layer 30 is configured such that the hardness of the resin 32 which forms the second region N2 is lower than the hardness of the resin 31 which forms the first region N1. Furthermore, the outer layer 30 is configured such that the hardness of the resin 33 which forms the third region N3 is higher than the hardness of the resin 32 which forms the second region N2.

Even in this case, in the tip portion 12F of the catheter 1F, it is possible to reduce the difference between the bending rigidity of the section that includes the inner layer 20F (the proximal end side of the tip portion 12F) and the bending rigidity of the section that does not include the inner layer 20F (the distal end side of the tip portion 12F). Consequently, it is possible to suppress the occurrence of a bending rigidity gap in the catheter 1F near the boundary between the section in which the inner layer 20F is arranged and the section in which the inner layer 20F is not arranged.

According to the catheter 1F of the sixth embodiment described above, even in a catheter which does not include the reinforcing body 40 and the coil body 50, it is possible to suppress the occurrence of a rigidity gap near the boundary between a position that includes the inner layer 20F and a position that does not include the inner layer 20F. Furthermore, because the outer layer 30 is configured such that the hardness of the resin 33 which forms the third region N3 is higher than the hardness of the resin 32 which forms the second region N2, it is possible to improve the deliverability through a bent constricted part.

Seventh Embodiment

Figure 9:
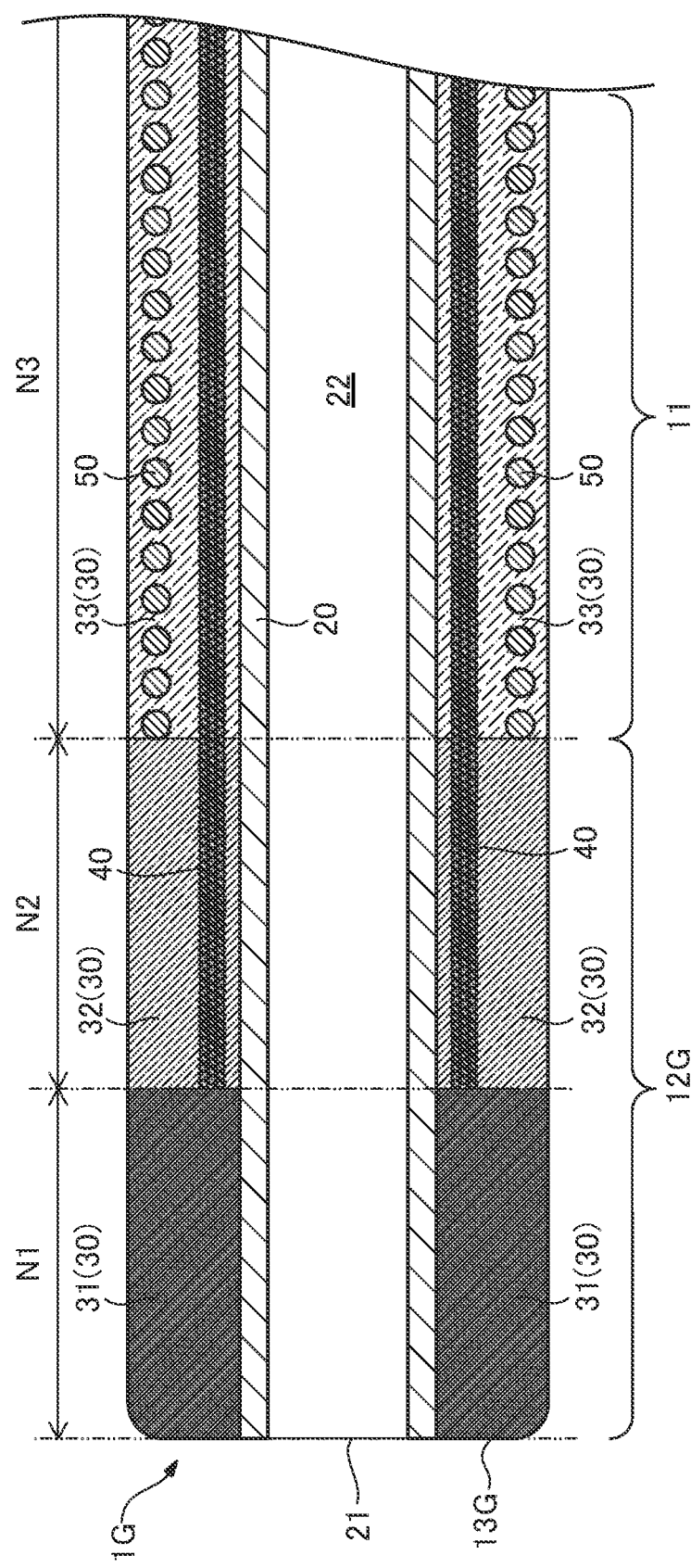
FIG. 9 is a schematic cross-sectional view of a portion of a catheter of a seventh embodiment.

FIG. 9 is a schematic cross-sectional view illustrating a section of a catheter 1G of a seventh embodiment at the distal end side. In the catheter 1G of the seventh embodiment, the shape of the tip portion 12G is different from that of the catheter 1 of the first embodiment. The rest of the configuration is the same as that of the catheter 1 of the first embodiment, and therefore, the description will be omitted. In the catheter 1G of the seventh embodiment, the tip portion 12G is configured so that the outer diameter is constant from the proximal end side to the distal end side.

Even in this case, in a similar manner to the first embodiment, because the outer layer 30 is configured such that the hardness of the resin 32 which forms the second region N2 is lower than the hardness of the resin 31 which forms the first region N1, in the tip portion 12G of the catheter 1G, it is possible to reduce the difference between the bending rigidity of the section that includes the reinforcing body 40 (the proximal end side of the tip portion 12G) and the bending rigidity of the section that does not include the reinforcing body 40 (the distal end side of the tip portion 12G). Consequently, it is possible to suppress the occurrence of a bending rigidity gap in the catheter 1G near the boundary between the section in which the reinforcing body 40 having a high bending rigidity is arranged, and the section in which the reinforcing body 40 is not arranged.

According to the catheter 1G of the seventh embodiment described above, even in a catheter in which the outer diameter of the tip portion 12G is not reduced toward the distal end side, it is possible to suppress the occurrence of a rigidity gap near the boundary between a position that includes the reinforcing body 40 and a position that does not include the reinforcing body 40. Furthermore, because the outer layer 30 is configured such that the hardness of the resin 33 which forms the third region N3 is higher than the hardness of the resin 32 which forms the second region N2, it is possible to improve the deliverability through a bent constricted part.

Eighth Embodiment

Figure 10:
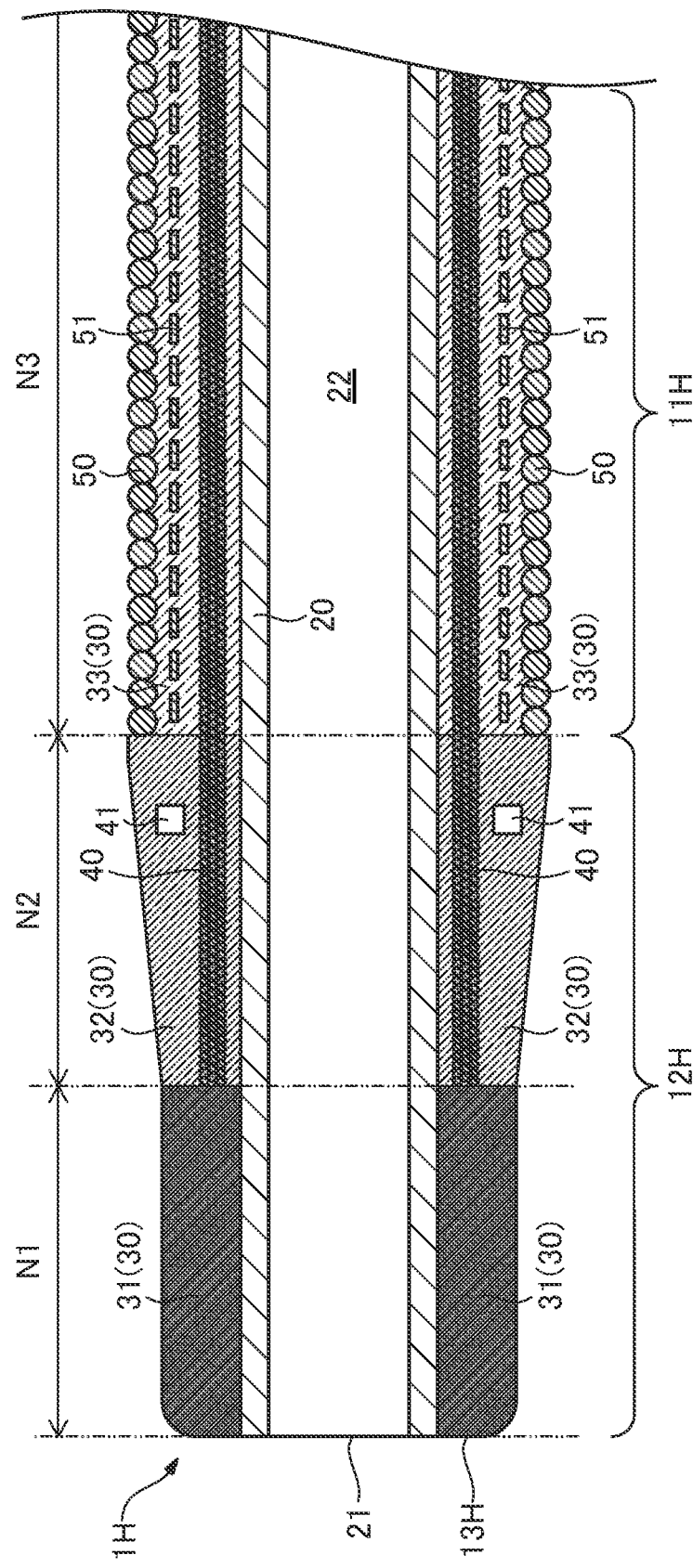
FIG. 10 is a schematic cross-sectional view of a portion of a catheter of an eighth embodiment.

FIG. 10 is a schematic cross-sectional view illustrating a section of a catheter 1H of an eighth embodiment at the distal end side. In the catheter 1H of the eighth embodiment, the tip portion 12H and the body portion 11H have a different shape and configuration from those of the catheter 1 of the first embodiment. In the catheter 1H of the eighth embodiment, the tip portion 12H has a configuration in which the outer diameter is constant in the first region N1, which is on the distal end side of the tip portion, and the outer diameter decreases toward the distal end side in the second region N2, which is on the proximal end side of the tip portion. Furthermore, the tip portion 12H includes a marker 41 which is opaque to X-rays. In the body portion 11H, a second coil body 51, in which a wire having a rectangular cross-section is wound, is arranged between the coil body 50 and the reinforcing body 40. The resin 33 of the third region N3 does not cover the coil body 50, and the coil body 50 is exposed to the outside.

Even in this case, in a similar manner to the first embodiment, because the outer layer 30 is configured such that the hardness of the resin 32 which forms the second region N2 is lower than the hardness of the resin 31 which forms the first region N1, in the tip portion 12H of the catheter 1H, it is possible to reduce the difference between the bending rigidity of the section that includes the reinforcing body 40 (the proximal end side of the tip portion 12H) and the bending rigidity of the section that does not include the reinforcing body 40 (the distal end side of the tip portion 12H). Furthermore, because the outer layer 30 is configured such that the hardness of the resin 33 which forms the third region N3 is higher than the hardness of the resin 32 which forms the second region N2, it is possible to improve the deliverability through a bent constricted part.

According to the catheter 1H of the eighth embodiment described above, even if the shape and configuration of the tip portion 12H and the body portion 11H are arbitrarily configured, by changing the hardness of the outer layer 30, it is possible to suppress the occurrence of a rigidity gap at the boundary between a position in which the reinforcing body 40 is provided and a position in which the reinforcing body 40 is not provided. Furthermore, because the hardness of the resin 33 of the body portion 11H is higher than the hardness of the resin 32 on the proximal end side of the tip portion 12H, it is possible to improve the deliverability through a bent constricted part.

Ninth Embodiment

Figure 11:
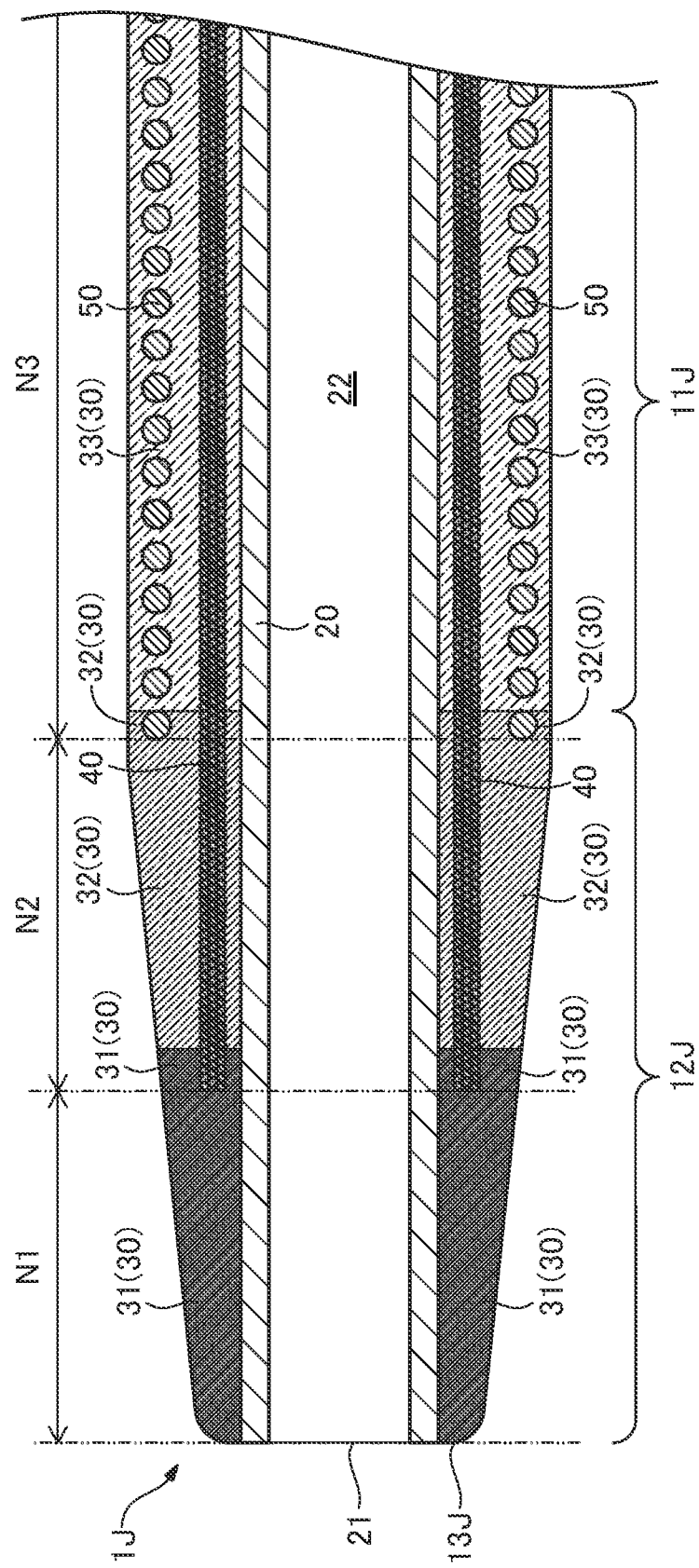
FIG. 11 is a schematic cross-sectional view of a portion of a catheter of a ninth embodiment.

FIG. 11 is a schematic cross-sectional view illustrating a section of a catheter 1J of a ninth embodiment at the distal end side. In the catheter 1J of the ninth embodiment, the resins of the second region N2 and the third region N3 of the outer layer 30 have a different configuration from those of the catheter 1 of the first embodiment. The rest of the configuration is the same as that of the catheter 1 of the first embodiment, and therefore, the description will be omitted. In the catheter 1J of the ninth embodiment, a portion of the resin 31 which forms the first region N1 enters the second region N2. Furthermore, a portion of the resin 32 which forms the second region N2 enters the third region N3. That is to say, in the second region N2 of the outer layer 30, a portion on the distal end side is formed of the resin 31, and the other portion of the second region is formed of the resin 32. Furthermore, in the third region N3 of the outer layer 30, a portion on the distal end side is formed of the resin 32, and the other portion of the third region is formed of the resin 33.

When a plurality of types of resins are contained in a single region of the outer layer 30 as in the ninth embodiment, the sum of the values obtained by multiplying the hardness of each resin by the volume ratio of each resin can be used as the hardness of the resin in that region. For example, the hardness of the resin which forms the second region N2 of the ninth embodiment is the sum of the values obtained by multiplying the hardness of each resin 31 and 32 which forms the second region N2 by the volume ratio of each resin. Furthermore, the hardness of the resin which forms the third region N3 of the ninth embodiment is the sum of the values obtained by multiplying the hardness of each resin 32 and 33 which forms the third region N3 by the volume ratio of each resin.

When the hardnesses of the resins of the second region N2 and the third region N3 are calculated in this manner, the outer layer 30 of the ninth embodiment is configured such that the hardness of the resin which forms the second region N2 is lower than the hardness of the resin 31 which forms the first region N1. Consequently, in the tip portion 12J of the catheter 1J, it is possible to reduce the difference between the bending rigidity of the section that includes the reinforcing body 40 (the proximal end side of the tip portion 12J) and the bending rigidity of the section that does not include the reinforcing body 40 (the distal end side of the tip portion 12J). Specifically, by setting the hardness of the resin of the second region N2, which covers the reinforcing body 40, to be lower than the hardness of the resin of the first region N1, which does not cover the reinforcing body 40, it is possible to reduce the difference between the bending rigidity of the proximal end of the tip portion 12J, which is configured by the resin of the second region N2, the reinforcing body 40, and the inner layer 20, and the bending rigidity of the distal end side of the tip portion 12J, which is configured by the resin of the first region N1 and the inner layer 20. Consequently, it is possible to suppress the occurrence of a bending rigidity gap in the catheter 1J near the boundary between the section in which the reinforcing body 40 having a high bending rigidity is arranged, and the section in which the reinforcing body 40 is not arranged.

According to the catheter 1J of the ninth embodiment described above, even when a plurality of types of resins are contained in a single region of the outer layer, it is possible to suppress the occurrence of a rigidity gap by changing the average value of the hardnesses of the resins contained in a single region. Furthermore, because the outer layer 30 is configured such that the hardness of the resin 33 which forms the third region N3 is higher than the hardness of the resin 32 which forms the second region N2, it is possible to improve the deliverability through a bent constricted part.

Tenth Embodiment

Figure 12:
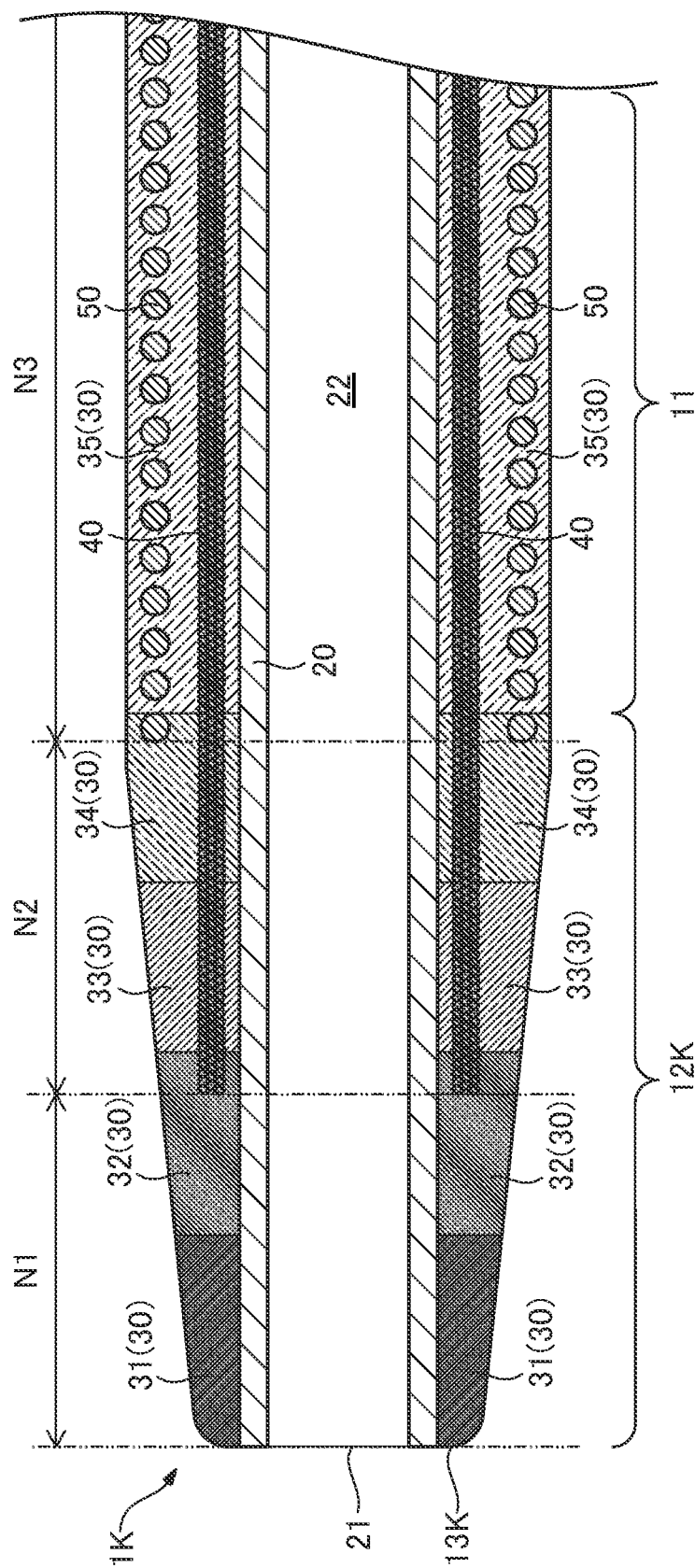
FIG. 12 is a schematic cross-sectional view of a portion of a catheter of a tenth embodiment.

FIG. 12 is a schematic cross-sectional view illustrating a section of a catheter 1K of a tenth embodiment at the distal end portion. In the catheter 1K of the tenth embodiment, the configurations of the resins of the first region N1, the second region N2, and the third region N3 of the outer layer 30 are different from those of the catheter 1 of the first embodiment. The rest of the configuration is the same as that of the catheter 1 of the first embodiment, and therefore, the description will be omitted. In the catheter 1K of the tenth embodiment, the first region N1 of the outer layer 30 is formed of the resin 31 and the resin 32, and a portion of the resin 32 enters the second region N2. Furthermore, the second region N2 is formed of the resin 32, the resin 33, and a resin 34, and a portion of the resin 34 enters the third region N3. The third region of the outer layer 30 is formed of the resin 34 and a resin 35.

When a plurality of types of resins are contained in a single region of the outer layer 30 as in the tenth embodiment, in a similar manner to the ninth embodiment described above, the sum of the values obtained by multiplying the hardness of each resin by the volume ratio of each resin can be used as the hardness of the resin in that region. The hardness of the resin which forms the first region N1 of the tenth embodiment is the sum of the values obtained by multiplying the hardness of each resin 31 and 32 which forms the first region N1 by the volume ratio of each resin. The hardness of the resin which forms the second region N2 is the sum of the values obtained by multiplying the hardness of each resin 32, 33, and 34 which forms the second region N2 by the volume ratio of each resin. Furthermore, the hardness of the resin which forms the third region N3 of the tenth embodiment is the sum of the values obtained by multiplying the hardness of each resin 34 and 35 which forms the third region N3 by the volume ratio of each resin.

When the hardnesses of the resins of the first region N1, the second region N2, and the third region N3 are calculated in this manner, the outer layer 30 of the tenth embodiment is configured such that the hardness of the resin which forms the second region N2 is lower than the hardness of the resin which forms the first region N1. Consequently, in the tip portion 12K of the catheter 1K, it is possible to reduce the difference between the bending rigidity of the section that includes the reinforcing body 40 (the proximal end side of the tip portion 12K) and the bending rigidity of the section that does not include the reinforcing body 40 (the distal end side of the tip portion 12K). Furthermore, because the outer layer 30 of the tenth embodiment is configured such that the hardness of the resin which forms the third region N3 is higher than the hardness of the resin which forms the second region N2, it is possible to improve the deliverability through a bent constricted part.

According to the catheter 1K of the tenth embodiment described above, even when a plurality of types of resins are contained in a single region of the outer layer, it is possible to suppress the occurrence of a rigidity gap by changing the average value of the hardnesses of the resins contained in a single region.

Eleventh Embodiment

Figure 13:
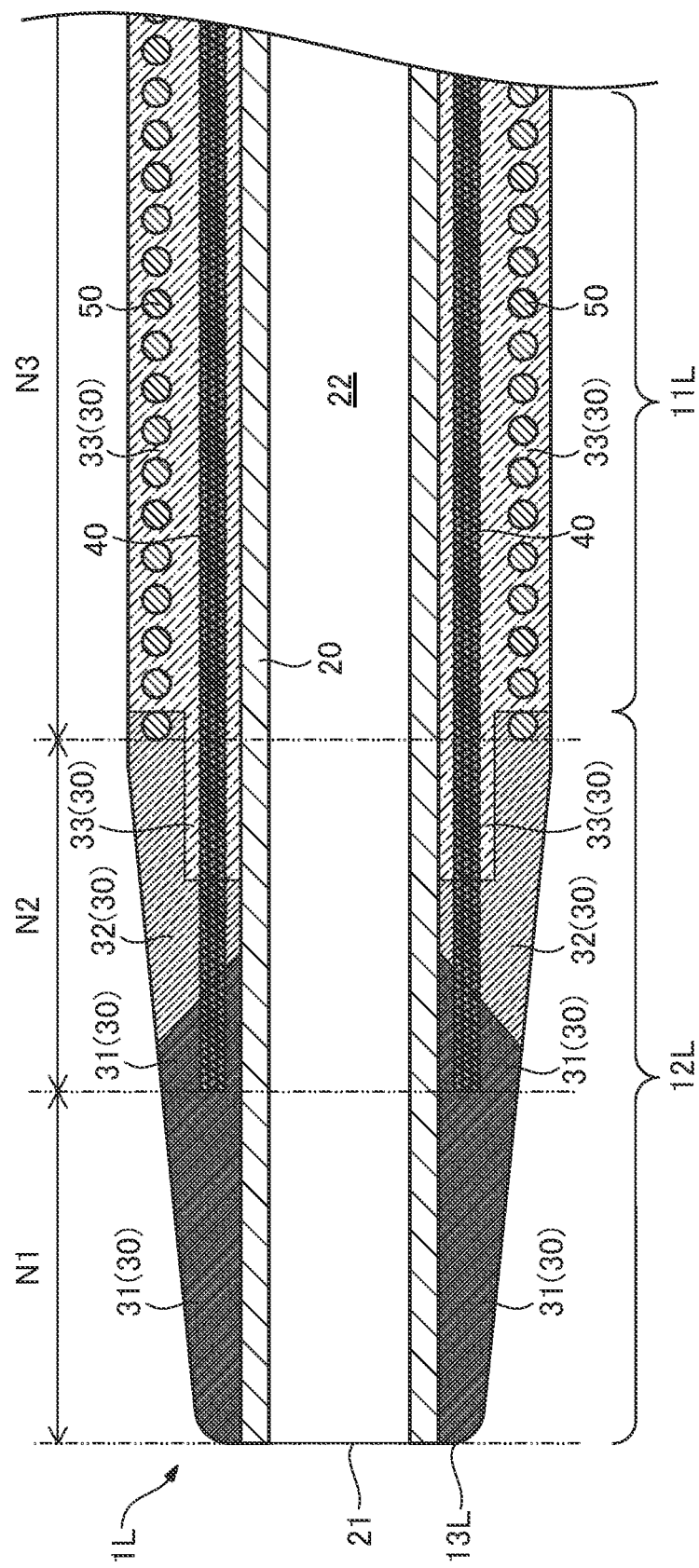
FIG. 13 is a schematic cross-sectional view of a portion of a catheter of an eleventh embodiment.

FIG. 13 is a schematic cross-sectional view illustrating a section of a catheter 1L of an eleventh embodiment at the distal end side. In the catheter 1L of the eleventh embodiment, the resin compositions of the second region N2 and the third region N3 of the outer layer 30 are different from those of the catheter 1 of the first embodiment. The rest of the configuration is the same as that of the catheter 1 of the first embodiment, and therefore, the description will be omitted. In the catheter 1L of the eleventh embodiment, a portion of the resin 31 which forms the first region N1 enters the second region N2. Furthermore, a portion of the resin 32 which forms the second region N2 enters the third region N3, and a portion of the resin 33 which forms the third region N3 enters the second region N2. That is to say, in the second region N2 of the outer layer 30, a portion on the distal end side is formed of the resin 31, and the proximal end side is formed of the resin 32 and the resin 33. Furthermore, in the third region N3 of the outer layer 30, a portion on the distal end side is formed of the resin 32, and the other portion of the third region is formed of the resin 33. The catheter 1L of the eleventh embodiment is configured such that the type of resin which forms the outer layer 30 changes in the radial direction of the catheter 1L. For example, at the boundary between the second region N2 and the third region N3, the radial inner side is formed of the resin 33, and the radial outer side is formed of the resin 32.

Even when different types of resins are contained in the radial direction of the catheter in a single region of the outer layer 30 as in the eleventh embodiment, in a similar manner to the ninth and tenth embodiments described above, the sum of the values obtained by multiplying the hardness of each resin by the volume ratio of each resin can be used as the hardness of the resin in that region. The hardness of the resin which forms the second region N2 of the eleventh embodiment is the sum of the values obtained by multiplying the hardness of each resin 31 to 33 which forms the second region N2 by the volume ratio of each resin. Furthermore, the hardness of the resin which forms the third region N3 of the eleventh embodiment is the sum of the values obtained by multiplying the hardness of each resin 32 and 33 which forms the third region N3 by the volume ratio of each resin.

When the hardnesses of the resins of the second region N2 and the third region N3 are calculated in this manner, the outer layer 30 of the eleventh embodiment is configured such that the hardness of the resin which forms the second region N2 is lower than the hardness of the resin which forms the first region N1. Consequently, in the tip portion 12L of the catheter 1L, it is possible to reduce the difference between the bending rigidity of the section that includes the reinforcing body 40 (the proximal end side of the tip portion 12L) and the bending rigidity of the section that does not include the reinforcing body 40 (the distal end side of the tip portion 12L), and to suppress the occurrence of a bending rigidity gap. Furthermore, because the outer layer 30 of the eleventh embodiment is configured such that the hardness of the resin which forms the third region N3 is higher than the hardness of the resin which forms the second region N2, it is possible to improve the deliverability through a bent constricted part.

According to the catheter 1L of the eleventh embodiment described above, even when a plurality of different types of resins are contained in the radial direction of the catheter in a single region of the outer layer, it is possible to suppress the occurrence of a rigidity gap by changing the average value of the hardnesses of the resins contained in a single region.

Twelfth Embodiment

Figure 14:
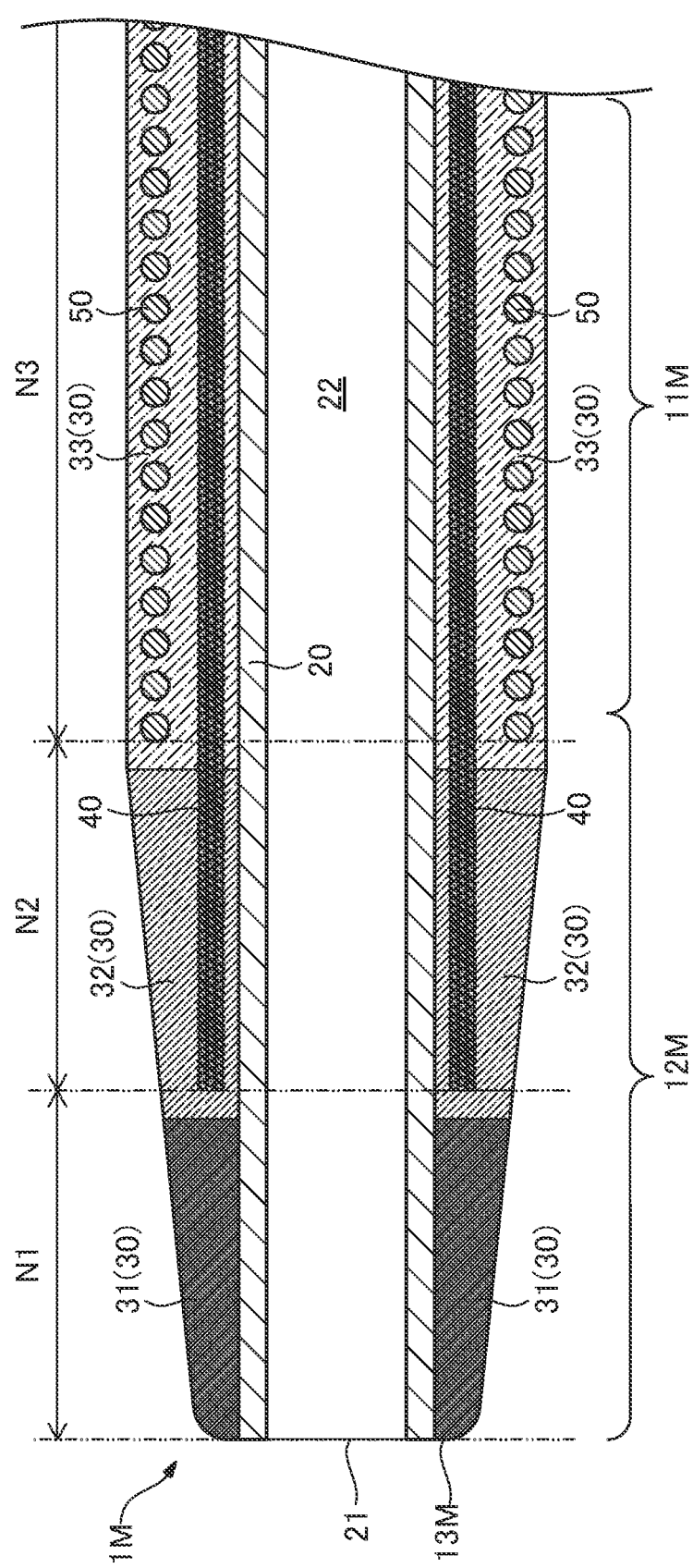
FIG. 14 is a schematic cross-sectional view of a portion of a catheter of a twelfth embodiment.

FIG. 14 is a schematic cross-sectional view illustrating a section of a catheter 1M of a twelfth embodiment at the distal end portion. In the catheter 1M of the twelfth embodiment, the configurations of the resins of the first region N1 and the second region N2 of the outer layer 30 are different from those of the catheter 1 of the first embodiment. The rest of the configuration is the same as that of the catheter 1 of the first embodiment, and therefore, the description will be omitted. In the catheter 1M of the twelfth embodiment, a portion of the resin 32 which forms the second region N2 enters the first region N1. Furthermore, a portion of the resin 33 which forms the third region N3 enters the second region N2. That is to say, in the first region N1 of the outer layer 30, a portion on the proximal end side of the first region is formed of the resin 32, and the other portion of the first region is formed of the resin 31. Furthermore, in the second region N2 of the outer layer 30, a portion on the proximal end side of the second region is formed of the resin 33, and the other portion of the second region is formed of the resin 32.

When a plurality of types of resins are contained in a single region of the outer layer 30 as in the twelfth embodiment, in a similar manner to the ninth embodiment described above, the sum of the values obtained by multiplying the hardness of each resin by the volume ratio of each resin can be used as the hardness of the resin in that region. For example, the hardness of the resin which forms the first region N1 of the twelfth embodiment is the sum of the values obtained by multiplying the hardness of each resin 31 and 32 which forms the first region N1 by the volume ratio of each resin. Furthermore, the hardness of the resin which forms the second region N2 of the twelfth embodiment is the sum of the values obtained by multiplying the hardness of each resin 32 and 33 which forms the second region N2 by the volume ratio of each resin.

When the hardnesses of the resins of the first region N1 and the second region N2 are calculated in this manner, the outer layer 30 of the twelfth embodiment is configured such that the hardness of the resin which forms the second region N2 is lower than the hardness of the resin which forms the first region N1. Consequently, in the tip portion 12M of the catheter 1M, it is possible to reduce the difference between the bending rigidity of the section that includes the reinforcing body 40 (the proximal end side of the tip portion 12M) and the bending rigidity of the section that does not include the reinforcing body 40 (the distal end side of the tip portion 12M), and to suppress the occurrence of a bending rigidity gap. Furthermore, because the outer layer 30 of the twelfth embodiment is configured such that the hardness of the resin 33 which forms the third region N3 is higher than the hardness of the resin which forms the second region N2, it is possible to improve the deliverability through a bent constricted part.

According to the catheter 1M of the twelfth embodiment described above, even when a plurality of types of resins are contained in a single region of the outer layer, it is possible to suppress the occurrence of a rigidity gap by changing the average value of the hardnesses of the resins contained in a single region.

Modifications of Present Catheters

The present invention is not limited to the embodiments described above, and implementation in various forms is possible within a scope not departing from the spirit of the present invention; for example, the following modifications are possible.

Modification 1

The catheter 1 of the first embodiment has been described as a so-called single lumen catheter which includes a single lumen 22. However, the catheter 1 may be a multi-lumen catheter that includes a plurality of lumens. The outer diameter of the body portion 11 of the catheter 1 may be constant or variable.

Modification 2

The catheter 1 of the first embodiment may or may not have a resin coating formed on the outer side of the outer layer 30. If a resin coating is formed on the outer side of the outer layer 30, different types of resin coatings may be formed in the first region N1, the second region N2, and the third region N3, or the same type of resin coating may be formed.

Modification 3

In the catheter 1 of the first embodiment, the outer diameter of the wire constituting the coil body 50 may be constant, or may be variable. The cross-sectional shape of the wire is not limited to a circular shape, and may be a rectangular shape or another shape. The coil body 50 may have a single thread or a plurality of threads. Furthermore, the coil body 50 may have a constant or variable coil pitch. The reinforcing body 40 may take a form other than that of a braided body. For example, the reinforcing body 40 may be a coil body. The hardness of the resin which forms the inner layer 20 may be higher or lower than the hardness of the resin which forms the outer layer 30.

Modification 4

In the catheter 1 of the first embodiment, it has been described that the first region N1 and the second region N2 of the outer layer 30 are the tip portion 12, and the third region N3 is the body portion 11. However, the catheter 1 may be configured such that the first region N1 of the outer layer 30 is the tip portion, and the second region N2 and the third region N3 are the body portion. Furthermore, in catheter 1, the first to third regions may all constitute the body portion, and the tip portion may be excluded. Furthermore, in the catheter 1, the tip portion and the body portion may be switched part way through any one of the first to third regions.

Modification 5

The outer layer 30 of the first embodiment may be formed of different types of resins in the circumferential direction of the catheter in at least one region of the first region N1, the second region N2, and the third region. Even in this case, the sum of the values obtained by multiplying the hardness of each resin by the volume ratio of each resin can be used as the hardness of the resin in that region.

Modification 6

The tip portion 12B of the second embodiment may be configured such that the inner diameter of the first region N1 of the outer layer 30 is smaller than the inner diameter of the second region N2, and equal to the inner diameter of the inner layer 20B. Similarly, in the tip portions in the third, fourth, and sixth embodiments, the inner diameter of the first region N1 of the outer layer 30 may be smaller than the inner diameter of the second region N2.

Modification 7

The inner layer 20 and the reinforcing body 40 of the second embodiment may have constant or variable thicknesses. Furthermore, the inner layer 20 and the reinforcing body 40 of the second embodiment may each be formed of a single material, or may be formed of a plurality of materials along the axial direction. When the rigidity of the inner layer 20 or the reinforcing body 40 changes in the axial direction, it is preferable to change the hardness of the resin which forms the outer layer 30 of those sections.

Modification 8

The configurations of the present catheters may also be applied to medical devices other than catheters. For example, the configurations of the present catheters may also be applied to dilators, endoscopes, guide wires, and the like. Moreover, parts of the configurations of the catheters illustrated in the first to twelfth embodiments may be appropriately combined or appropriately removed.

The present aspects have been described above based on embodiments and modifications, however the embodiments of the aspects described above are intended to facilitate an understanding of the present aspects, and in no way limit the present aspects. The present aspects may be modified and improved without departing from the spirit and scope of the claims, and equivalents thereof are also included in the present aspects. Furthermore, if a technical feature is not described as essential within the present specification, it can be eliminated as appropriate.

The invention claimed is:

1. A catheter comprising:
an outer layer;
an inner layer forming a lumen;
a reinforcing body that is a metal-braided layer arranged outside the inner layer; and
a coil body arranged outside the reinforcing body and covered with the outer layer;
wherein:
a distal end of the inner layer is located proximally of a distal end of the outer layer;
the outer layer has:
a first region extending from the distal end of the outer layer to the distal end of the inner layer; and
a second region which is positioned proximally of the first region and covers the inner layer;
a resin which forms the second region of the outer layer has a lower hardness than a hardness of a resin which forms the first region; and
a distal end of the reinforcing body is located proximally of the distal end of the inner layer, and a distal end of the coil body is located proximally of the distal end of the reinforcing body.

2. The catheter according to claim 1, wherein:
the outer layer includes a tip portion, which constitutes a distal end portion of the catheter and has a contracted portion in which an outer diameter of the tip portion contracts moving distally along the contracted portion; and
the contracted portion includes the first region and the second region.

3. The catheter according to claim 2, wherein:
the outer layer includes a body portion which is positioned proximally of the tip portion; and
the body portion includes a third region which is located proximally of the second region.

4. The catheter according to claim 1, wherein:
the second region is located distally of the distal end of the coil body.

5. A method for producing a catheter, the method comprising:
preparing an inner layer forming a lumen, a reinforcing body that is a metal-braided layer arranged outside the inner layer, and a coil body arranged outside the reinforcing body; and
forming an outer layer comprising a resin over the coil body, the inner layer, and the reinforcing body,
wherein:
in forming the outer layer, when a first region of the outer layer extending from a distal end of the outer layer to a distal end of the inner layer, and a second region which is positioned proximally of the first region and covers the inner layer are formed, a hardness of a resin which forms the second region is lower than a hardness of a resin which forms the first region; and
in the catheter, the distal end of the inner layer is located proximally of the distal end of the outer layer, a distal end of the reinforcing body is located proximally of the distal end of the inner layer, and a distal end of the coil body is located proximally of the distal end of the reinforcing body.

* * * * *